US005567095A

United States Patent [19]

James et al.

[11] Patent Number: 5,567,095

[45] Date of Patent: Oct. 22, 1996

[54] VEHICULAR MOBILE OCCUPANT CARRIER

[76] Inventors: David R. James, 418 Shawnee Cir., Byron, Ga. 31008; Thomas D. Turner, Rte. 2, Box 780, Fort Valley, Ga. 31030

[21] Appl. No.: 343,012

[22] Filed: Nov. 21, 1994

Related U.S. Application Data

[63] Continuation of Ser. No. 11,896, Feb. 1, 1993, abandoned.

[51] Int. Cl.[6] ........ B60P 7/08

[52] U.S. Cl. ........ 410/7; 410/4; 280/250.1

[58] Field of Search ........ 410/3, 4, 7, 22, 410/23, 51, 153; 296/68.1, 19; 280/304.1, 250.1; 297/DIG. 4; 248/503, 503.1

[56] References Cited

U.S. PATENT DOCUMENTS

| | | | |
|---|---|---|---|
| 1,835,840 | 12/1931 | Barclay | 296/19 X |
| 4,019,752 | 4/1977 | Leon et al. . | |
| 4,265,478 | 5/1981 | Korsgaard . | |
| 4,325,576 | 4/1982 | Guthrie . | |
| 4,369,995 | 1/1983 | Harder, Jr. . | |
| 4,389,056 | 6/1983 | Tenniswood | 410/23 X |
| 4,407,616 | 10/1983 | Hinze | 296/68.1 |
| 4,588,340 | 5/1986 | Howard | 410/51 X |
| 4,601,620 | 7/1986 | Bugger et al. . | |
| 4,623,289 | 11/1986 | Apostolos | 410/7 |
| 5,344,265 | 9/1994 | Ullman et al. | 410/3 |

FOREIGN PATENT DOCUMENTS

| | | | |
|---|---|---|---|
| 3423646 | 1/1986 | Germany | 410/4 |
| 3-7682 | 1/1991 | Japan | 296/68.1 |
| 2130977 | 6/1984 | United Kingdom | 410/3 |

*Primary Examiner*—Karen B. Merritt
*Assistant Examiner*—Stephen Gordon
*Attorney, Agent, or Firm*—Gerald R. Boss; Cort Flint

[57] ABSTRACT

A vehicular mobile occupant carrier system A which includes mobile occupant carrier B and upstanding securement stanchion C. Mobile occupant carrier B includes a frame 12 which includes an occupant support frame 18 and a bottom frame 20 made unitary by a first junction frame 36 and a second junction frame 38. Upstanding securement stanchion C includes a base member 60, a carrier securing section 14 and a headrest 64. A four-point restraint system D includes latch bars 41*a*, 41*b*, 42*a* and 42*b* integral with mobile occupant carrier B interlocked with rotary locks 72 integral with carrier securing section 14 of upstanding securement stanchion C, restraining mobile occupant carrier B in three-degrees of freedom. Strap restraining system 44 includes a lap belt 46 and upper torso straps 48 which may alternately be connected to upstanding securement stanchion C or to frame 16 of mobile occupant carrier B for restraining occupant of mobile occupant carrier. Mobile occupant carrier B is aligned with upstanding securement stanchion C and moved into engagement so that latching bars 41*a*, 41*b*, 42*a*, and 42*b* of mobile occupant carrier B are received by receiving channels 72*b* of upstanding securement stanchion C to automatically lock rotary locks 72. The mobile occupant carrier B is securely attached to upstanding securement stanchion C and actively resists forces imposed during vehicle operation and potential vehicle crashes.

8 Claims, 6 Drawing Sheets

VEHICULAR MOBILE OCCUPANT CARRIER

This is a continuation of application Ser. No. 08/011,896 filed on Feb. 1, 1993 and now abandoned.

BACKGROUND OF THE INVENTION

The invention relates to a mobile occupant carrier restraining device in general, and, in particular, to a vehicular mobile occupant carrier system which includes a mobile occupant carrier having a frame and a multiple point connector mechanism which may be interlocked with an upstanding securement stanchion so that the mobile occupant carrier and occupant may effectively resist forces that occur during normal vehicle operation and those that occur in crashes.

With the advent of a mobile society, the safe transportation of individuals utilizing mobile occupant carriers in secondary vehicles such as transit buses and school buses has become a major concern. The secondary vehicle may subject the mobile occupant carrier and its occupant to a variety of forces resulting from normal driving maneuvers as well as rear-end collisions, front-end collisions, collisions from the side, and even roll-overs. For the safety of the individual occupant in all of these situations, the mobile occupant carrier and Occupant are required to be safely secured within the vehicle.

Although numerous mobile occupant carrier restraining devices have been developed, they are for the most part inadequate in that such devices are designed to be utilized with a standard foldable mobile occupant carrier. Hence these designs require complicated means of securing the standard mobile occupant carrier and occupant because these mobile occupant carriers do not have adequate structural integrity nor contain any special features to aid in its securement other than their wheels.

For example, U.S. Pat. No. 4,265,478 utilizes an independent latching means to secure a mobile occupant carrier to a stanchion. Such an independent mechanism contains inherent difficulties in its operation by requiring multiple steps to operate and is vulnerable to being misplaced and hence rendering the securing stanchion useless. U.S. Pat. Nos. 4,369,995; 4,325,576; 4,601,620; and 4,019,752 show other arrangements for securing wheelchairs in transportation vehicles.

Additionally, most standard foldable mobile occupant carriers are not designed to withstand forces of a magnitude routinely encountered in a vehicular collision. Thus, when a vehicular collision is encountered, the force of the collision is transmitted to the mobile occupant carrier and the mobile occupant carrier may collapse. Furthermore, most standard foldable mobile occupant carriers do not meet safety standards and are unsuitable for transport by a secondary vehicle.

Accordingly, an object of the present invention is to provide a mobile occupant carrier system for a person with diminished capacity for mobility e.g., an infant or a physically disabled person, that can withstand the forces that may be encountered while being transported in a secondary vehicle.

An additional object of the present invention is to provide a mobile occupant carrier that is comprised of a frame such that the mobile occupant carrier can withstand the forces that may be encountered while being transported in a secondary vehicle.

Another object of the invention is to provide a multiple belt securement system that secures the occupant directly to the mobile occupant carrier rather than to the secondary vehicle. This allows the occupant to be secured to the mobile occupant carrier by family members, medical attendants or other qualified caregivers prior to and independent of the arrival of the secondary vehicle. This provides for more appropriate securement of the occupant especially in those cases where the occupant is medically fragile or where special support, orthopedic device and the like must be used in the securement of the occupant. The driver/attendant of the secondary vehicle may then be relieved of the responsibility of securing the occupant to the mobile occupant carrier, and need only be concerned with loading/unloading of the "prepackaged" occupant in the mobile occupant carrier and securing the mobile occupant carrier to the upstanding securement stanchion. This could reduce the need for special medical training of the driver/attendant of the secondary vehicle, relieving them of certain responsibilities, and significantly improving the efficiency of the loading/unloading procedure.

Furthermore, another object of the present invention is to provide a mobile occupant carrier with a multiple-point connector mechanism which may be interlocked with an upstanding securement stanchion to effectively resist operational and crash forces.

Additionally, another object of the present invention is to provide a mobile occupant carrier with a multiple-point connector mechanism which may be interlocked with an upstanding securement stanchion with minimal effort and difficulty.

A further object of the present invention is to provide an upstanding securement stanchion that can effectively secure a mobile occupant carrier in a manner to resist operational and crash forces.

SUMMARY OF THE INVENTION

The above objectives are accomplished according to the invention by providing a vehicular mobile occupant carrier system which includes a mobile occupant carrier and an upstanding securement stanchion for securing the mobile occupant carrier. A multiple-point connector mechanism interlocks the mobile occupant carrier with the upstanding securement stanchion so that the mobile occupant carrier and occupant may effectively resist forces imposed by vehicle operation and potential crashes in three degrees of freedom. The mobile occupant carrier has a frame which allows the mobile occupant carrier to withstand forces incurred while being transported in a secondary vehicle. The mobile occupant carrier includes an occupant support frame having a back frame with a back rest and a seat frame with a seat for bracing the individual occupant and a bottom frame which includes a foot rest and directional wheels. The bottom frame and occupant support frame are connected by a pair of junction frames. The axle for the primary wheels is supported by the junction frames.

A multiple strap restraining assembly retains the occupant within the mobile occupant carrier and secures the occupant to the carrier. Initially, the strap restraining assembly is solely connected to the mobile occupant carrier with the ends of the lap belt integral with the junction frames. The upper torso straps are connected to anchorages on the upper rear of the mobile occupant carrier to provide restraint to the occupant during maneuvering and loading of the mobile occupant carrier into the secondary vehicle. After the mobile occupant carrier is interconnected and secured to the upstanding securement stanchion, the upper torso straps are disconnected from the anchorages on the upper rear of the mobile occupant carrier and reconnected to connector mechanisms on the upstanding securement stanchion. In the final configuration any force exerted by the occupant during vehicle operation or vehicle collision is transferred to the upstanding securement stanchion.

The upstanding securement stanchion has a base for connection with the vehicle, a carrier securing section for interconnection with the mobile occupant carrier and a headrest which provides the individual with support and privacy.

A multiple-point connector mechanism provides for securing the mobile occupant carrier with the upstanding securement stanchion to resist forces imposed during vehicle operation and crashes. The multiple-point connector mechanism has multiple points of mechanized attachment which include latch elements connected to the mobile occupant carrier and interlocked with the carrier securing section of the upstanding securement stanchion. The carrier securing section has a plurality of fasteners containing latching means to lock the latch elements in place and thus securing the mobile occupant carrier and occupant. In the preferred embodiment rotary locks are used as the latching means and latch bars are used as latch elements.

The interrelation between the latch bars and the latching means provides for numerous configurations. The latching means may be located on the upstanding securement stanchion to receive the latch bars either vertically or horizontally. Hence the latch bars can be either vertically or horizontally attached to the frame of the mobile occupant carrier. The latch bars transmit any load experienced by the mobile occupant carrier to the upstanding securement stanchion. The upstanding securement stanchion includes a release means to unlock the latch bars. In the preferred embodiment a release handle attached to a shaft interconnected with a rotational plate are used for release means.

In a separate configuration, a mobile adaptive carrier is utilized with an upstanding securement stanchion for securing the occupant and replaces the standard mobile occupant carrier. Many immobile individuals are confined to a secondary transport device, such devices range from infant car seats to specially constructed orthopedic devices. The mobile adaptive carrier is constructed with universal mounting plates having a peg-board-like construction to allow for such secondary transport device to be mounted to the mobile adaptive carrier. A multiple-point connector mechanism interlocks the mobile adaptive carrier with the upstanding securement stanchion so that the mobile adaptive carrier and occupant may effectively resist forces imposed by vehicle operation and potential crashes in three degrees of freedom.

DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

Referring now in more detail to the drawings, a vehicular mobile occupant carrier system A is illustrated for providing mobility of an individual having a diminished capacity for self-mobility while providing a means for transporting the individual within a vehicle. The occupant carrier system includes a mobile occupant carrier B and an upstanding securement stanchion C as can best be shown in FIGS. 1 through 4. A multiple-point connector mechanism D includes a plurality of latch bars which secure mobile occupant carrier B to a carrier securing section 14 of upstanding securement stanchion C. FIG. 2 illustrates mobile occupant carrier B interlocked with upstanding securement stanchion C through multiple-point connector mechanism D. This interconnection allows the securement of mobile occupant carrier B and upstanding securement stanchion C to effectively resist forces incurred during normal vehicle operation and crashes.

Figure 4:
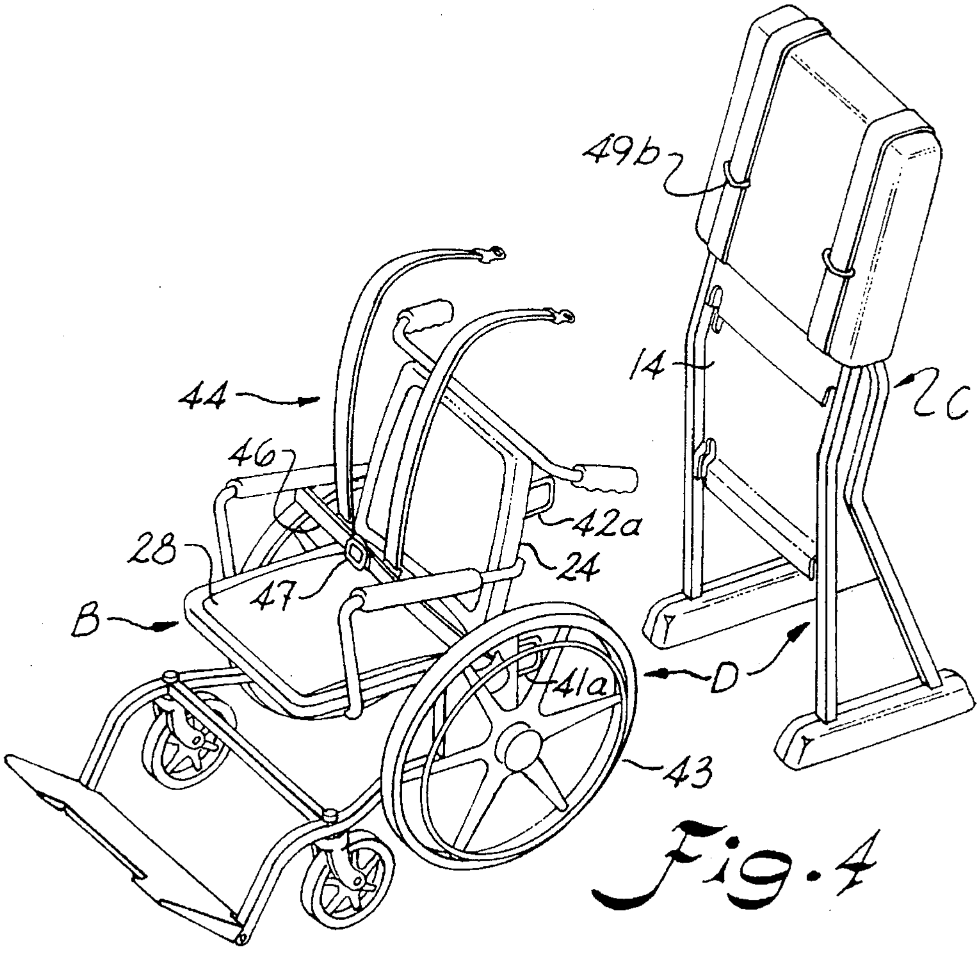
FIG. 4 is a front perspective view illustrating an upstanding securement stanchion in position to receive a mobile occupant carrier.
Figure 10:
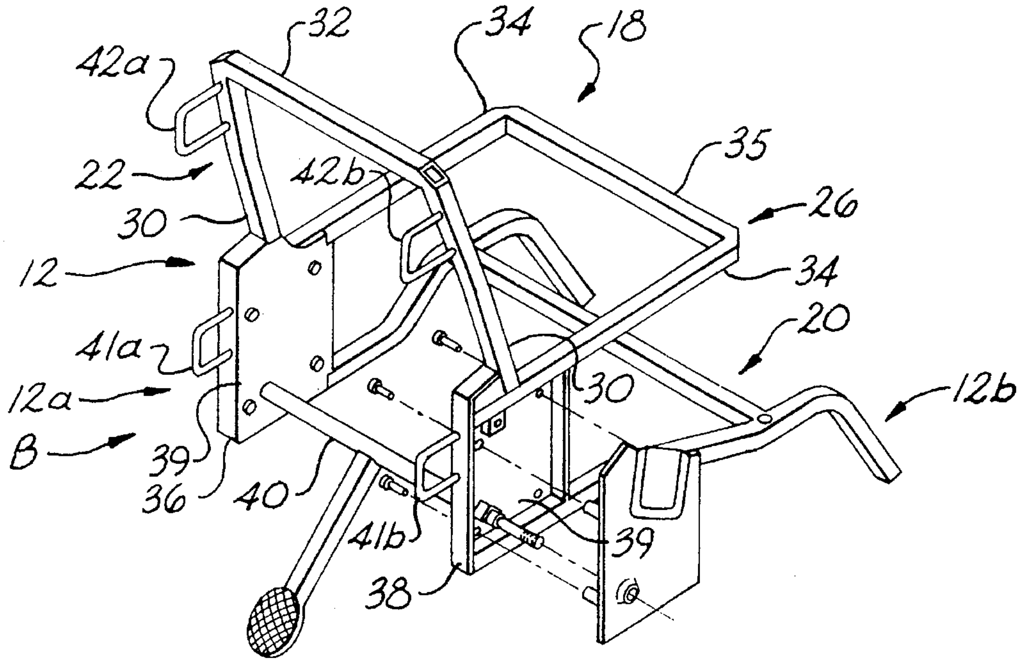
FIG. 10 is an exploded view of a frame for a mobile occupant carrier constructed according to the invention.

As shown in FIG. 10, the mobile occupant carrier B is comprised of a non-foldable unitary carrier frame 12 which includes an occupant support frame 18 and a bottom frame 20. Unitary carrier frame 12 has a first side frame **12*a* and second side frame 12*b*. Occupant support frame 18 includes a back frame 22 and a seat frame 26. As shown in FIG. 4, back frame 22 includes a seat back panel 24 and seat frame 26 has a seat panel 28. Back frame 22 has two generally vertical side frame members 30 opposite from each other which are integral with a top frame member 32 which form seat back panel 24. Seat frame 26 includes two generally horizontal side frame members 34 opposite from each other which are integral with a front frame member 35 forming seat panel 28**.

A first junction frame 36 located on first frame side 12*a* and a second junction frame 38 located on second frame side 12*b* receive an axle 40. Junction frame 36 and 38 connect occupant support frame 18 with bottom frame 20 and make the framework a unitary structure. Seat frame 26 is cantilevered by first junction frame 36 and second junction frame 38 so that all forces applied to seat frame 26 are transferred to first junction frame 36 and second junction frame 38. First junction frame 36 and second junction frame 38 are each preferably in the form of a structural plate 39.

Figure 3:
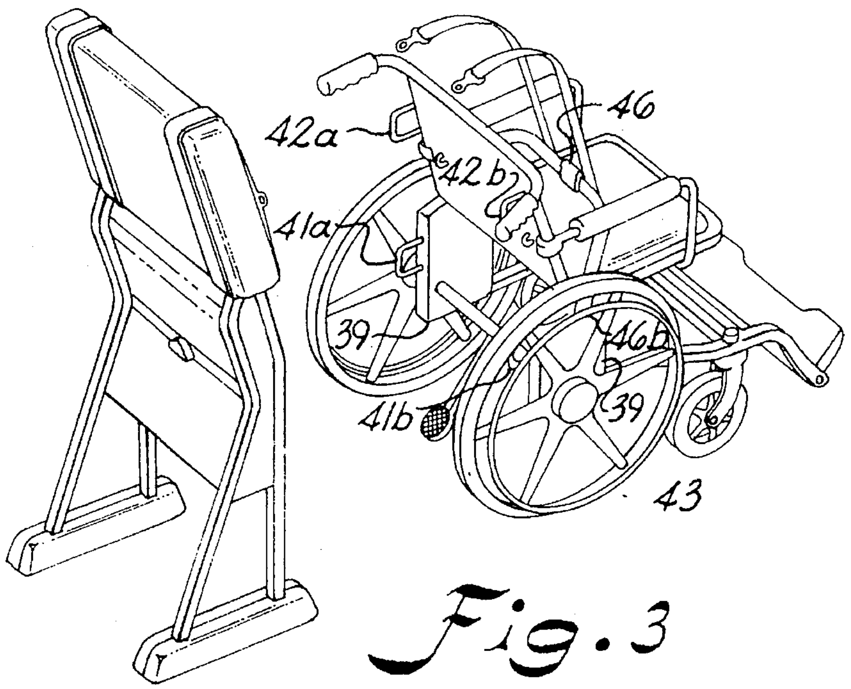
FIG. 3 is a rear perspective view illustrating an upstanding securement stanchion in position to receive a mobile occupant carrier according to the invention.

As illustrated in FIG. 3, there are latch bars 41*a* and 41*b* integral with the structural plate 39 of first junction frame 36 and structural plate 39 of second junction frame 38 respectively. There is a first plurality of latch elements which includes latch bars 41*a*, 41*b*, and 42*a*, 42*b*. There are latch bars 42*a* and 42*b* connected to occupant support frame 18, which in combination with latch bars 41*a* and 41*b* provide a male portion for multiple-point connector mechanism D which secure mobile occupant carrier B to upstanding securement stanchion C. Accordingly, latch bars 41*a*, 41*b*, 42*a*, and 42*b* are located on a back side of mobile occupant carrier B for engagement with upstanding securement stanchion C. Latch bars 42*a* and 42*b* are vertically spaced from latch bars 41*a* and 41*b*. Additionally, latch bar 41*b* is horizontally spaced from latch bar 41*a* and latch bar 42*b* is horizontally spaced from latch bar 42*a*. Accordingly, in this configuration, four contact points are provided for multiple point connector mechanism D to secure mobile occupant carrier B to upstanding securement stanchion C. In the preferred embodiment latch bars 42*a* and 42*b* are integral with back frame 22 for securing the upper portion of mobile occupant carrier B. Wheels 43 are carried by axle 40 and provide mobile occupant carrier B with mobility.

The preferred embodiment is constructed such that loads exerted by mobile occupant carrier B and the occupant are transferred to upstanding securement stanchion C. This is done by having the mobile occupant carrier B secured to upstanding securement stanchion C through utilization of latch bars 41*a*, 41*b* and 42*a*, 42*b*. Furthermore seat frame 26 is integrally connected to first and second junction frames 36, 38 with back frame 22 abutting seat frame 26 at the union of seat frame 26 with first and second junction frames 36, 38. As a result, a load exerted by back frame 22 and/or seat frame 26 is transferred to latch bars 41*a* and 41*b* integral with first and second junction frames 36, 38, and subsequently transferred to the upstanding securement stanchion C by utilizing multiple-connector mechanism D. Any load exerted by back frame 22 not transferred to latch bars 41*a* and 41*b* will be transferred to latch bars 42*a* and 42*b* and subsequently transferred to upstanding securement Stanchion C by utilizing multiple-connector mechanism D.

Figure 1:
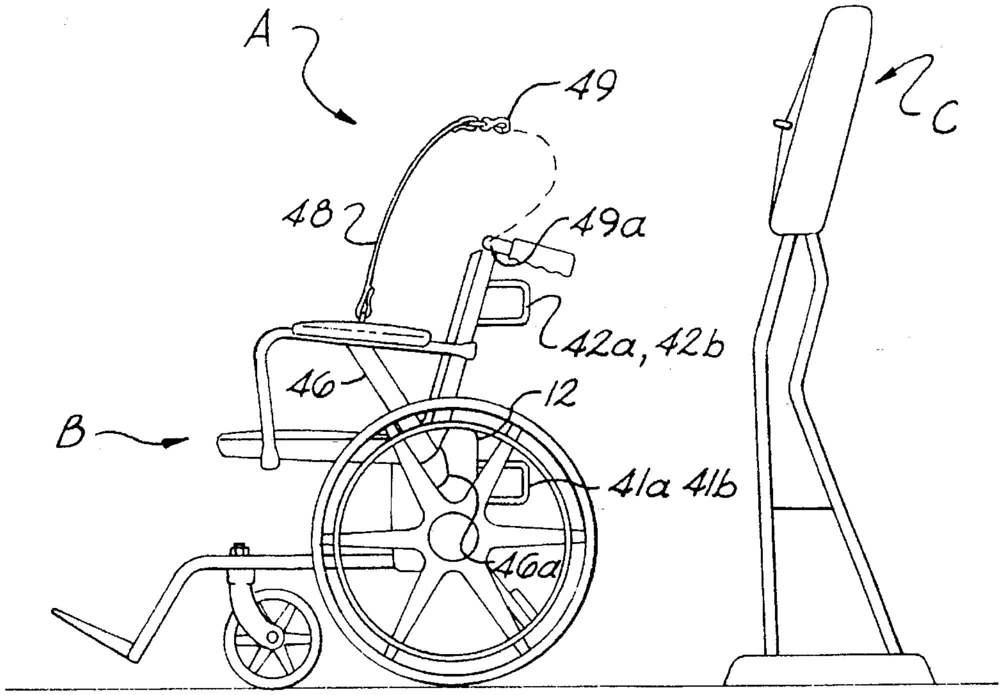
FIG. 1 is a side elevation illustrating an upstanding securement stanchion in position to receive a mobile occupant carrier according to the invention.
Figure 2:
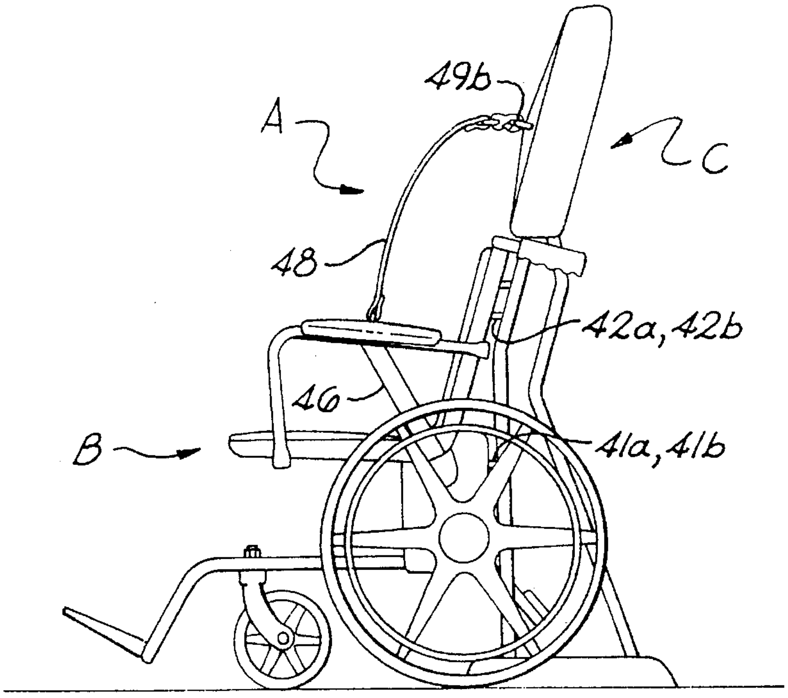
FIG. 2 is a side elevation illustrating a mobile occupant carrier being secured to an upstanding securement stanchion with a restraining strap assembly interconnected with both the upstanding securement stanchion and the mobile occupant carrier according to the invention.

As shown in FIGS. 1, 3 and 4, strap restraining assembly 44 has lap belt 46 with first end 46*a* connected to plate 39 of first junction frame 36, and second end 46*b* connected to plate 39 of second junction frame 38. Buckle 47 interconnects first end 46*a* with second end 46*b*. Strap restraining assembly 44 further includes upper torso straps 48 having attachment members 49. Attachment members 49 can either be connected to an anchorage 49*a* integral with top frame member 32 on frame 12, as illustrated by dotted lines in FIG. 1, or to an anchorage 49*b* integral with upstanding securement stanchion C as shown in FIG. 2.

All loads exerted by the occupant are transferred to upstanding securement stanchion C through strap restraining assembly 44 by having upper torso straps 48 connected to upstanding securement stanchion C at anchorages 49*b* and having first and second ends 46*a* and 46*b* of lap belt 46 connected to structural plates 39 of the first and second junction frames 36, 38. All forces exerted through first and second junction frame 36, 38 are transferred to upstanding securement stanchion C through latch bars 41*a* and 41*b* of a multiple-connector mechanism D.

Figure 6:
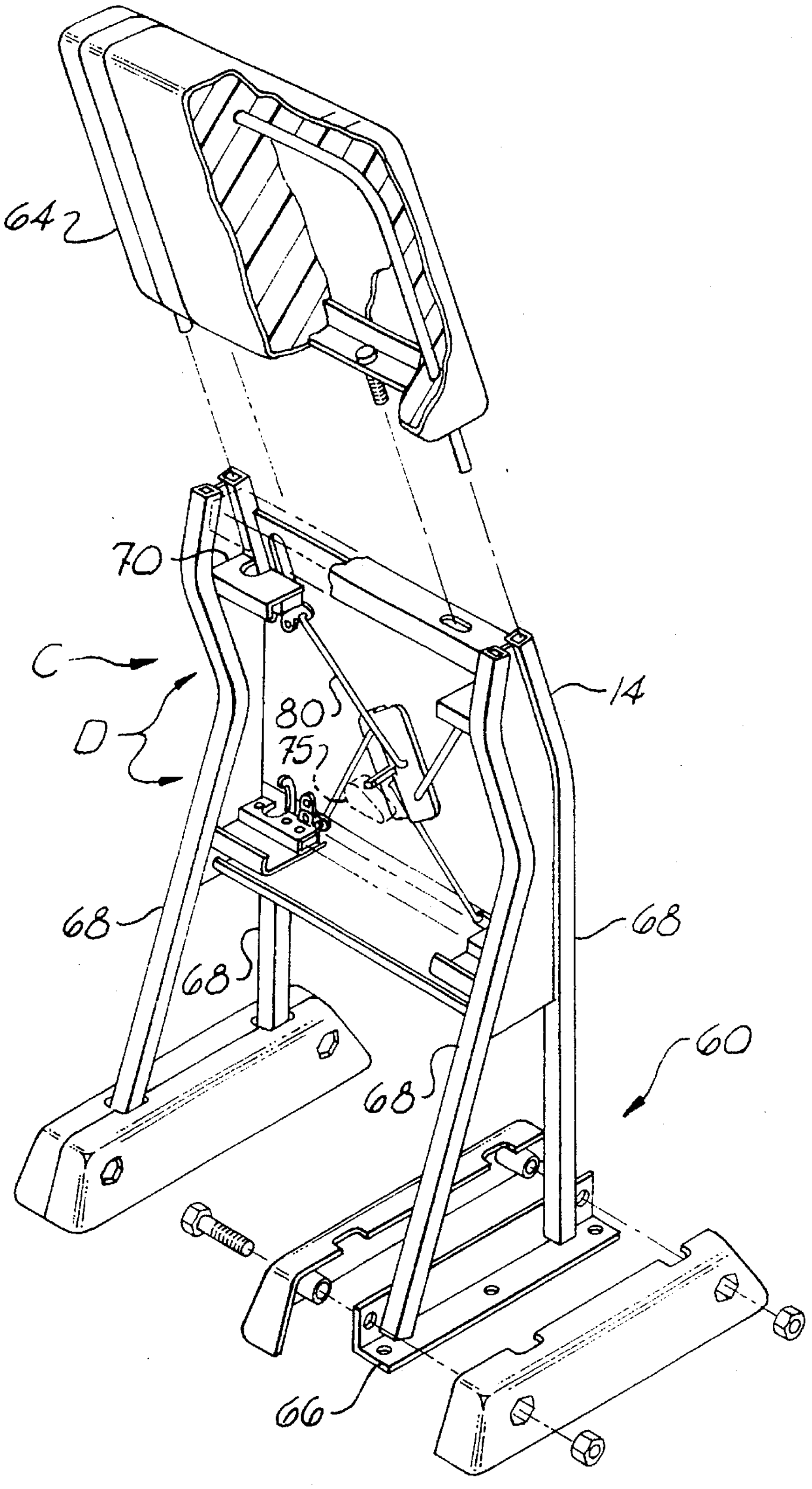
FIG. 6 is an exploded view of an upstanding securement stanchion with a back panel removed illustrating locking and release mechanisms according to the invention for a multiple-point connector assembly.
Figure 7:
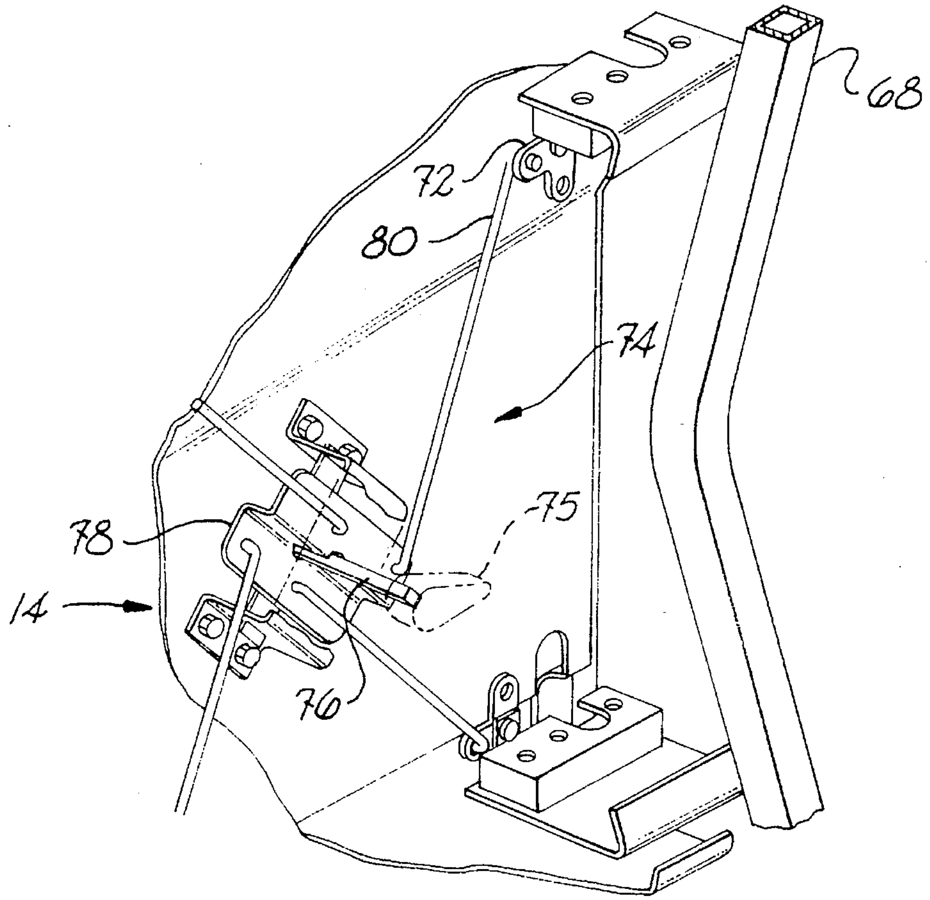
FIG. 7 is an enlarged partial view of the back of an upstanding securement stanchion with a back panel removed illustrating latches and release mechanisms for an upstanding securement stanchion constructed in accordance with the invention.
Figure 8:
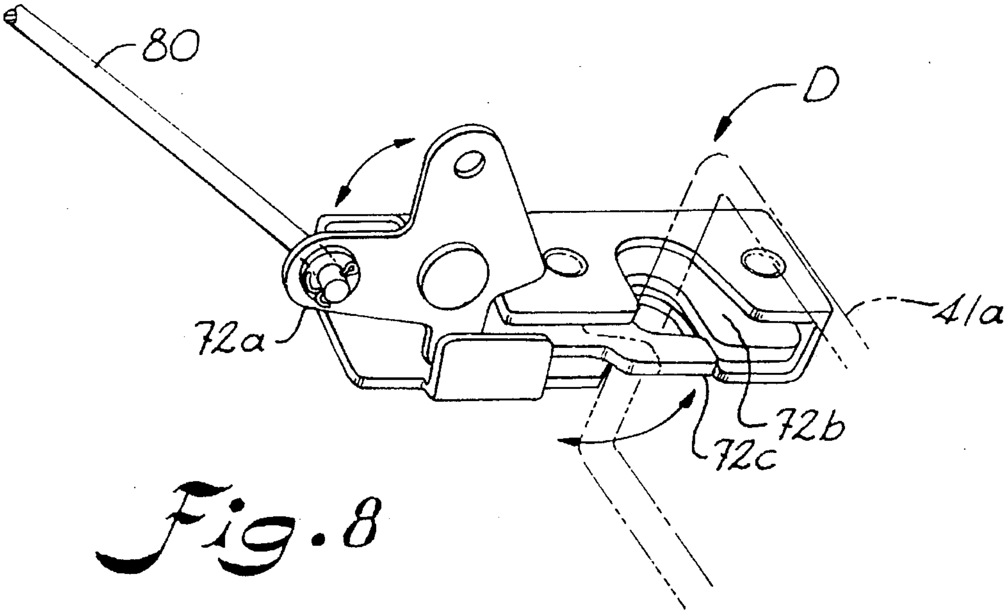
FIG. 8 is a perspective view illustrating a latch of the mechanism of FIG. 7 engaging a latch bar of a mobile occupant carrier or mobile adaptive carrier according to the invention.
Figure 9:
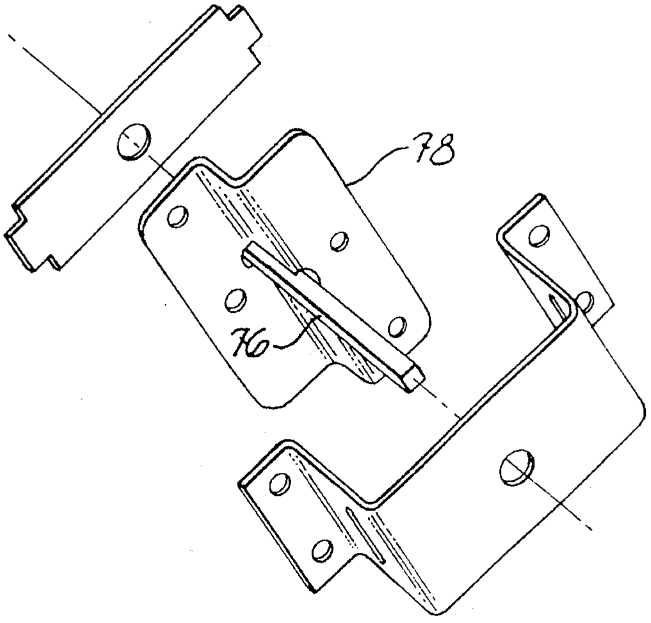
FIG. 9 is a partial exploded view of a release mechanism for an upstanding securement stanchion according to the invention.

As illustrated in FIGS. 6, 7 and 8, upstanding securement stanchion C has a base member 60, a carrier securing section 14 and a headrest 64. Base member 60 has a bottom section 66 and upstanding legs 68. Carrier securing section 14 has a plurality of latch elements in the form of four fasteners 70 containing rotary locks 72 for providing a female recipient in conjunction with latch bars 41*a*, 41*b* and 42*a*, 42*b* forming multiple-point connector mechanism D. Rotary locks 72 must be automotive type mechanisms with strength performance ratings equal to or exceeding model 400 R&L lock distributed by Austin Hardware and Supply Company of Kansas City, Mo. which conform to the latest Federal Motor Vehicle Safety Standard 206 as of Feb. 1, 1993. Rotary locks 72 include a pivotal securing element 72*a*, a receiving channel 72*b* and pivotal locking tongue 72*c*. Carrier securing section 14 extends vertically upward from base member 60 to a length sufficient so that fastener 70 may be in a permanent ready position for receiving latch bars 41*a*, 41*b*, 42*a* and 42*b*. In the preferred embodiment, this height is generally of equal height to mobile occupant carrier B for restraining the upper portion of mobile occupant carrier B. Rotary locks 72 receive latching latch bars 41*a*, 41*b*, 42*a* and 42*b* in a respective receiving channel 72*b*. When latch bars 41*a*, 41*b*, 42*a* and 42*b* enter a respective receiving channel, a pivotal locking tongue 72*c* is pivoted closing off a receiving channel. Securing element 72*a* pivots in a direction to lock a pivotal locking tongue 72*c* into place thereby locking latch bars to upstanding securement stanchion C. Rotary locks 72 are self-locking and automatically lock latch bars 41*a*, 41*b*, 42*a* and 42*b* upon there respective entry into receiving channel 72*b*.

In the preferred embodiment, four rotary locks 72 in combination with latch bars 41*a*, 41*b*, 42*a*, and 42*b* provide a four-point restraint system. The four-point restraint system secures mobile occupant carrier B to upstanding securement stanchion C so that the mobile occupant carrier B, and occupant, effectively resist vehicle operation and crash forces. Carrier securing section 14 has a release means 74 which includes a handle 75, a shaft 76 and a rotational plate 78. Rotational plate 78 is connected with rotary locks 72 by connecting rods 80 so that the rotary locks 72 may be unlocked from a locked position by having shaft 76 rotated by handle 75.

In operation, mobile occupant carrier B is aligned with upstanding securement stanchion C, as can best be seen in FIGS. 3 and 4, and moved into engagement so that latching bars 41*a*, 41*b*, 42*a*, and 42*b* of mobile occupant carrier B are received by receiving channels 72*b* of respective rotary locks 72. Engagement by a respective latching bar automatically pivots pivotal securing lock 72*c* around the latching bars. Upon the pivoting of respective pivotal securing locks 72*c*, pivotal securing elements 72*a* automatically pivot to lock the pivotal securing locks around the latching bars to prevent the exit of the latching bars from the receiving channels. The mobile occupant carrier B is securely attached to upstanding securement stanchion C. The above operation is conducted without any interaction of the operator or by an assistant, but only requires mobile occupant carrier B to be rolled in contact with upstanding securement stanchion C such that latching bars 41*a*, 41*b*, 42*a*, and 42*b* are received by receiving channels 72*b*.

Thus, it can be seen that an advantageous construction for a vehicular mobile occupant carrier securement system can be had according to the invention wherein a mobile occupant carrier and upstanding securement stanchion affixed to a vehicle floor may be mechanically connected using a four-point restraint system to effectively resist various forces.

Loads created by mobile occupant carrier B and an occupant are transferred to latching bars through a frame and left and right side junction frames. With the latching bars interlocked with upstanding securement stanchion C, the occupant carrier B and occupant are securely restrained against movement in three degrees of freedom. This design provides restraint of the occupant carrier and occupant with minimal effort.

Figure 5:
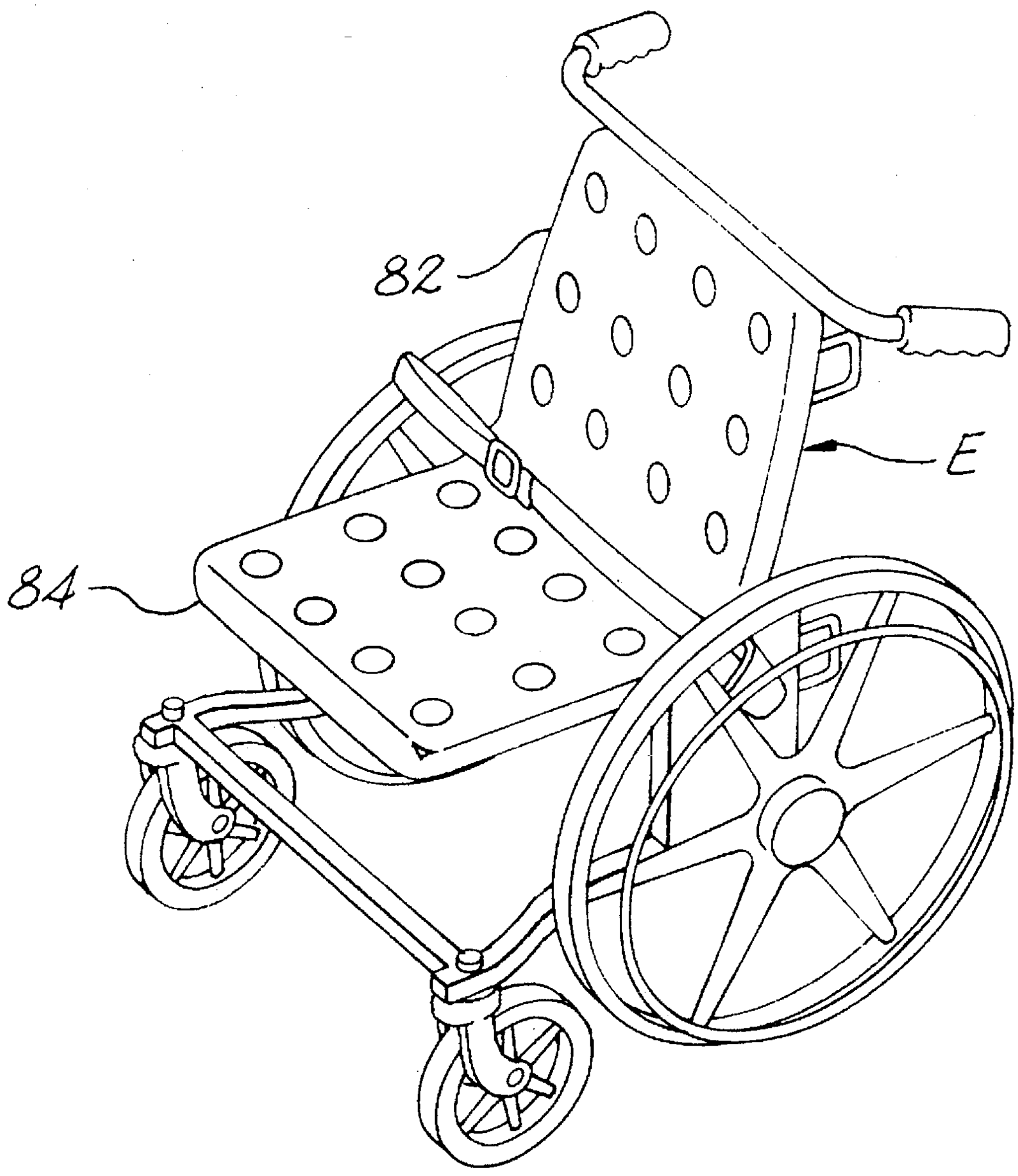
FIG. 5 is a perspective view illustrating a mobile adaptive carrier constructed according to the invention.

As shown in FIG. 5, a mobile adaptive carrier E having a horizontal universal mounting plate 84 and a vertical universal mounting plate 82 may replace the mobile occupant carrier B in vehicular mobile occupant carrier system A. Universal mounting plates 84 and 82 have a peg-board-like grid system to allow for the securement of any secondary transport device such as an infant child seat or an orthopedic support.

While a preferred embodiment of the invention has been described using specific terms, such description is for illustrative purposes only, and it is to be understood that changes and variations may be made without departing from the spirit or scope of the following claims.

What is claimed is:

1. A vehicular mobile occupant carrier system for providing transportation of a physically impaired individual within a transportation vehicle, comprising:

a wheeled mobile occupant carrier for carrying said individual which includes a non-folding, unitary carrier frame having an occupant support frame and a bottom frame, and said occupant support frame includes a back frame and seat frame;

spaced junction frames rigidly connecting said occupant support frame and said bottom frame on spaced opposing sides of said carrier frame to provide an integral wheeled occupant carrier;

each of said junction frames including a rigid structural interconnecting plate;

a plurality of wheels carried by said bottom frame including a pair of directional wheels pivoting about a vertical axis; a pair of driving wheels rotating about a rear wheel axis carried by said junction frames for providing said occupant carrier with mobility;

lower horizontally spaced latch bars carried by said spaced junction frames above said rear wheel axis and extending outwardly beyond the profile of said back frame;

each of said lower horizontally spaced latch bars being firmly affixed to said spaced junction frames at spaced attachments and including outwardly projecting latching apertures;

upper horizontally spaced latch bars carried by said back frame and extending outwardly from said back frame beyond the profile of said back frame;

said upper horizontally spaced latch bars being vertically spaced from said lower horizontally spaced latch bars providing at least four spaced points of securement of said occupant support frame;

each of said upper horizontally spaced latch bars being firmly affixed to said back frame at spaced attachments and including outwardly projecting latching apertures;

an upstanding securement stanchion extending from a floor of said transportation vehicle generally along a back side of said back frame of said occupant support frame;

said securement stanchion including a base disposed rearwardly of said occupant support frame for securing said stanchion to said vehicle floor;

a carrier securing section included in said securement stanchion, spaced rearwardly from said occupant support frame for receiving said upper and lower latch bars, and said carrier securing section extending vertically above said base at least to a height nearly above said back frame so that said occupant carrier and securement stanchion may be secured together in a uniform force resisting manner;

lower latch elements carried by said carrier securing section at a position generally equal to the position of said lower latch bars for receiving and securing said lower latch bars to said carrier securing section for restraining movement of said mobile occupant carrier in three degrees of freedom;

upper latch elements carried by said carrier securing section at a position generally equal to the position of said upper latch bars for receiving and securing said upper latch bars for securing to said carrier securing section for restraining movement of said mobile occupant carrier in three degrees of freedom;

said upper and lower latch elements cooperating with said upper and lower latch bars to interlock said occupant carrier to said upstanding stanchion at four spaced points of vertical and horizontal engagement so that forces exhibited on said mobile occupant carrier are distributed generally in a uniform manner between said carrier frame and said securement stanchion; and said upper and lower latch bars being arranged in horizontal alignment with said upper and lower latch elements so that said occupant carrier interlocks with said upstanding securement stanchion when said occupant carrier is moved in a translational rearward motion along a vehicle floor to engage said securement stanchion.

2. The apparatus of claim 1 wherein said upper and lower latch elements include lock elements interconnected to a common release mechanism via rods communicating with each of said lock elements for moving said lock elements simultaneously to an unlocked position thereby releasing said upper and lower latch bars from said lock elements.

3. The apparatus of claim 2 wherein said common release mechanism includes a rotational plate connected to said rods, said rotational plate having a first position in which said latch bars are positively locked to said stanchion, said rotational plate having a second position in which said lock elements are simultaneously unlocked and said latch bars are released.

4. The apparatus of claim 1 including a head rest integral with said carrier securing section for providing support to said individual.

5. The apparatus of claim 1 wherein said upper and lower horizontally spaced latch bars are located near said seat frame.

6. The apparatus of claim 1 including a strap restraining assembly carried with said occupant support frame for restraining said individual to said occupant support frame.

7. The apparatus of claim 1 wherein said rear wheel axis extends through said structural plates of said junction frames.

8. The apparatus of claim 1 wherein said stanchion base includes spaced apart upstanding legs.

* * * * *